United States Patent [19]

Jackson et al.

[11] Patent Number: 4,531,749
[45] Date of Patent: Jul. 30, 1985

[54] CIRCULAR SEAL WITH INTEGRAL BACKUP RINGS

[75] Inventors: Jay W. Jackson, Huntsville; Ruben E. Golden, Trinity, both of Tex.

[73] Assignee: Hughes Tool Company, Houston, Tex.

[21] Appl. No.: 500,212

[22] Filed: Jun. 2, 1983

[51] Int. Cl.³ .............................................. F16J 15/18
[52] U.S. Cl. .................................. 277/188 A; 277/180
[58] Field of Search ................. 277/188 R, 188 A, 180

[56] References Cited

U.S. PATENT DOCUMENTS

| | | | |
|---|---|---|---|
| 3,094,337 | 6/1963 | Pipert et al. | 277/188 A |
| 3,319,661 | 5/1967 | Shindler | 277/188 A |
| 3,391,780 | 7/1968 | Edwards | 166/120 |
| 3,531,133 | 9/1970 | Sheesley et al. | 277/180 |
| 3,810,639 | 5/1974 | Scannell | 277/188 A |
| 4,296,806 | 10/1981 | Taylor et al. | 166/120 |
| 4,384,726 | 5/1983 | Meyer | 277/188 A |

Primary Examiner—Robert I. Smith
Attorney, Agent, or Firm—Robert A. Felsman; Charles D. Gunter, Jr.

[57] ABSTRACT

A circular seal configuration is shown for sealing the annular clearance between an inner cylindrical member and an outer cylindrical member. A center portion of the seal is made of a compliant elastomer material and is adapted to seal both against the internal diameter of the outer cylindrical member and against the external diameter of the inner cylindrical member. A pair of external backup rings circumscribe the exterior surface of the elastomeric center portion and a pair of internal backup rings circumscribe the interior surface of the elastomeric center portion. The backup rings are of a relatively stiff material but expand independently upon the application of pressure of the elastomeric portion of the seal to provide a zero clearance fit with respect to the surrounding sealing surfaces and prevent extrusion of the elastomer which would cause a seal failure.

2 Claims, 3 Drawing Figures

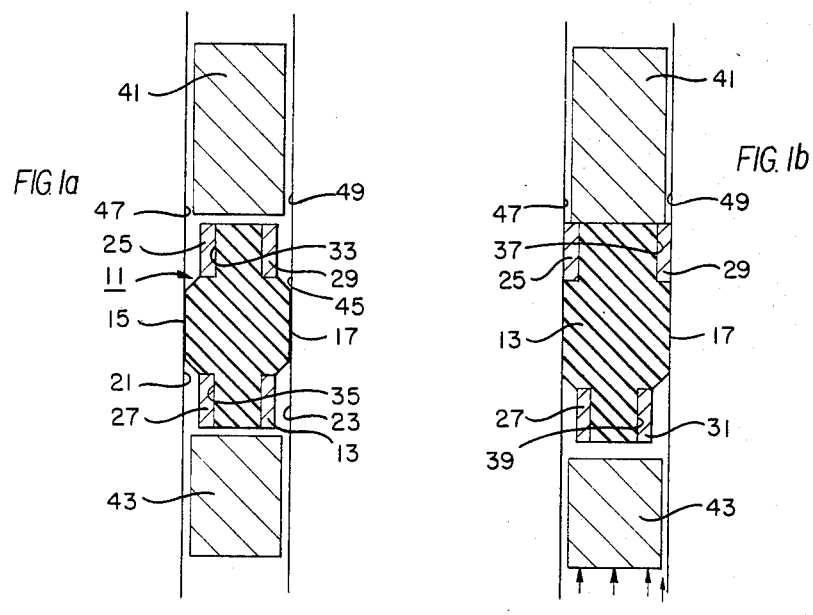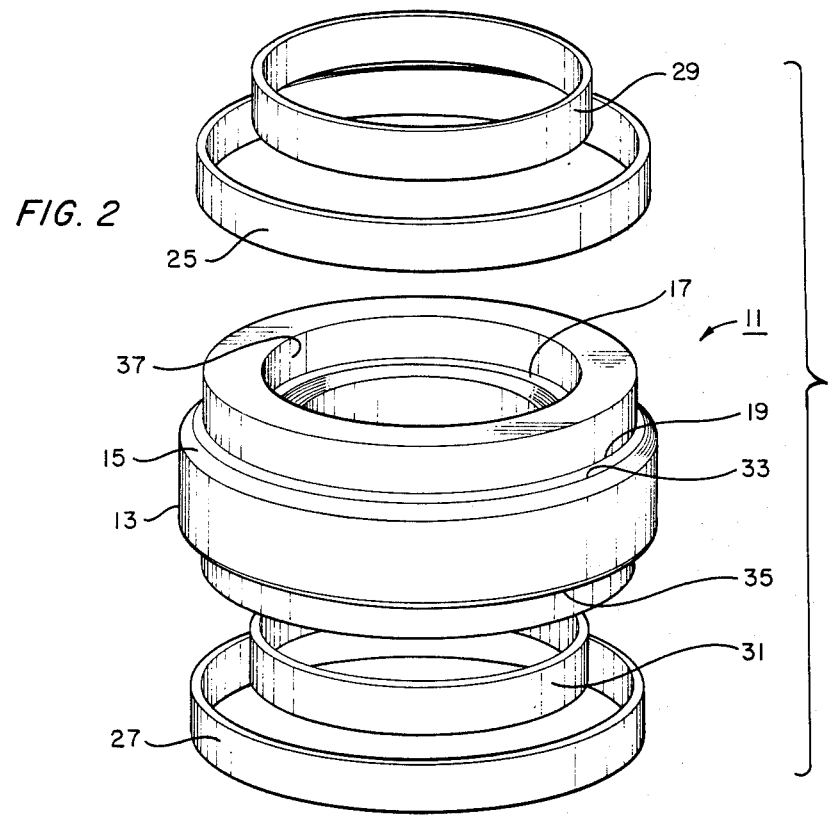

CIRCULAR SEAL WITH INTEGRAL BACKUP RINGS

CROSS-REFERENCE TO RELATED APPLICATIONS

The disclosure contained in this application is related to the disclosure contained in the application of James W. Montgomery, entitled "Sandwich Shaped Piston Seal", Ser. No. 500,213, filed concurrently herewith and now U.S. Pat. No. 4,466,617.

BACKGROUND OF THE INVENTION

The present invention relates to generally circular seal configurations of the type used for sealing the annular clearance between an inner cylindrical member and an outer cylindrical member and, more specifically, to a circular seal of the type used to seal the annular clearance between a cylinder internal diameter and a piston rod outer diameter.

Circular, piston type seal constructions are used in many environments where it is desirable to seal off the clearance which exists between an inner cylindrical member, such as the outer diameter of a piston rod, and an outer cylindrical member. In downhole tools of the type used in the oil industry, such as packers, liner hangers, and the like, such circular seals are used to provide a fluid seal, as between an inner mandrel and an outer tubular member in a well tool. When pressure is applied to the annular space between the tubular mandrel and outer tubular member, the circular seals seats to that, for instance, a cone element can be hydraulically driven in the direction of a slip element to cause outward radial movement of the slips to grip a surrounding casing in the well bore.

Seal configurations in the well environment are typically subjected to pressures in the range of 2,000 psi at 200°–300° F. and are subject to the destructive effects of contaminants such as drilling fluids, reservoir fluids and hydrogen sulfide contamination.

A need exists for a circular seal for sealing the annular clearance between an inner cylindrical member and an outer cylindrical member which can withstand pressures in the range of 2,000–7,500 psi and greater at temperatures in the range of 300°–400° F. or greater.

There exists a need for such a seal design which can withstand the effects of hydrogen sulfide and other contaminants of the type commonly encountered in wellbore operations.

SUMMARY OF THE INVENTION

A circular seal for sealing the annular clearance between an inner cylindrical member and an outer cylindrical member is shown which has a center portion made of a compliant elastomer material which is adapted to seal against both the internal diameter of the outer cylindrical member and against the external diameter of the inner cylindrical member. The elastomeric center portion is generally cylindrically shaped with a raised external rib and a corresponding raised internal rib circumscribing the midregion thereof. A pair of external backup rings are received on either side of the raised external rib and a pair of internal backup rings are similarly received on either side of the raised internal rib. The raised external and raised internal ribs of the elastomeric center portion of the seal are selectively sized to contact the respective internal diameter of the outer cylindrical and the external diameter of the inner cylindrical member when pressure acts on the seal. The backup rings are undersized for the internal diameter of the outer cylindrical member and inner cylindrical member, respectively, but expand when pressure acts on the seal to provide a zero clearance fit with the outer cylindrical member and inner cylindrical member.

Additional objects, features and advantages will be apparent in the written description which follows.

BRIEF DESCRIPTION OF THE DRAWINGS

FIG. 1a is a cross-sectional view of a cylindrical tool showing a circular seal of the invention in the relaxed state.

FIG. 1b is a cross-sectional view of a cylindrical portion of a tool showing the seal of the invention in the expanded state.

FIG. 2 is an exploded perspective view of the circular seal of the invention.

DETAILED DESCRIPTION OF THE INVENTION

Turning to FIG. 1a, the circular seal of the invention is shown designated generally as 11. As can be seen in FIGS. 1a and FIG. 2, the circular seal 11 includes a center portion 13 made of a compliant elastomer material, preferably rubber. Any elastomer which is suitable for the working environment can be used including soft and hard rubbers, nitrile rubber, Viton, and the like. Viton is preferred in the oil well environment for its ability to withstand the destructive effects of well contaminants at high pressures and temperatures.

The center portion 13 is generally cylindrically shaped with a raised external rib 15 (FIG. 2) and a corresponding raised internal rib 17 circumscribing the midregion 19 thereof. The material selected for the elastomeric center portion 13 must be capable of being expanded radially outwardly as shown in FIG. 1b for contacting the internal diameter 21 of an outer cylindrical member and the external diameter 23 of an inner cylindrical member.

As shown in FIG. 1a and FIG. 2, a pair of external backup rings 25, 27 circumscribe the exterior surface of the elastomeric center portion and a matching pair of internal backup rings 29, 31 circumscribe the interior surface of the elastomeric center portion 13.

The backup rings are of a relatively stiff material. The preferred material is a metal such as steel although other materials such as brass, glass filled plastic, and the like can be used. The external backup rings 25, 27, as shown in FIG. 1, are received in matching grooves 33, 35 on either side of the raised external rib 15 and the internal backup rings 29, 31 are similarly received in grooves 37, 39 formed on either side of the raised internal rib 17.

The operation of the invention is best illustrated with reference to FIGS. 1a and 1b. FIG. 1a shows a typical installation in which the circular seal 11 is in place between the internal diameter 21 of an outer cylindrical member and the external diameter 23 of an inner cylindrical member. Upper and lower headers such as upper metal ring 41 and lower metal ring 43 are also present in the assembly illustrated in FIG. 1a. In the assembly illustrated in FIG. 1a, the external diameter 23 could be the external surface of an inner tubular mandrel of an oil well tool which is separated by an annular clearance 45 from the internal diameter 21 of a surrounding cylindrical member. The seal 11 is sized so that the ribs 15, 17 provide an interference fit with the surfaces 21, 23. The object of such an assembly is to provide a seal between the inner cylindrical member 23 and the outer cylindrical member 21 when pressure is applied in the annular clearance 45, as in the direction of the arrows shown in FIG. 1b. Such pressure could be provided, for instance, in pressuring up a downhole tool such as a hydraulically set liner hanger (not shown). When pressure is applied on the seal in the direction of the arrows shown in FIG. 1b, it acts through the seal 11 on the upper metal ring 41 which could, in turn, actuate the cones on a liner hanger to set the slips and hang the tool from the well casing.

Although the parts shown in FIG. 1a are shown with the clearances somewhat exaggerated for ease of illustration, it was in the past necessary to provide the smallest possible clearance between the headers 41, 43 and the diameters 21, 23.

In the seal 11 of the invention, the elastomeric ribs 15, 17 are sized to provide an interference fit with the diameters 21, 23. As best seen in FIG. 1a, the stiff backup rings 25, 27, 29 and 31 are undersized for the diameters 21, 23 in the relaxed state. When pressure acts on the seal 11, the backup rings 25, 29 on the end of the seal 11 opposite the pressure expand to provide a zero clearance fit with respect to the diameters 21, 23, as shown in FIG. 1b. This prevents the elastomeric center portion 13 from extruding into the gaps 47, 49.

The geometric shape of the center portion 13 and arrangement of the external and internal backup rings 25, 27, 29 and 31 provide a seal for the annular clearance 45 when an end pressure is applied, allowing headers 41, 43 to be used with greater tolerance or clearance between the metal parts. The metal backup rings are strained as shown in FIG. 1b and expand radially on the end of the seal opposite the pressure to prevent the elastomeric ribs 15, 17 from extruding over the backup rings and through the gaps 47, 49. As shown in FIG. 1b, the backup rings expand to seat against the diameters 21, 23 after the primary sealing surfaces 15, 17 seat to provide a zero clearance fit at the gaps 47, 49.

In a typical liner hanger application, the metal headers 41, 43 were required in the past to be machined to a tolerance in the range from about 0.002-0.003 inches at the gaps 47, 49. Using the circular seal 11 of the invention, metal headers can be used which have not been precision machined and which have a tolerance of 0.020 inches or more at the gaps 47, 49. Since the metal backup rings prevent the elastomeric portion 13 from extruding through the gaps 47, 49, much greater pressure can be sealed than was previously thought possible.

The backup rings can be held on the elastomeric center portion 13 by bonding the rings to the rubber using known techniques or the center portion 13 can be molded and the backup rings fitted about the center portion.

The invention provided has significant advantages. The seal construction is relatively simple to manufacture and has been tested in downhole tool applications for sealing at pressures in the range of 7500 psi at 400° F. The non-extruding features of the seal allow greater machining tolerances of the metal parts being sealed. The seal configuration is adaptable to a variety of sealing requirements such as sealing a piston shaft within a cylindrical piston bore.

While the invention has been shown in only one of its forms, it is not thus limited but is susceptible to various changes and modifications without departing from the spirit thereof.

I claim:

1. A circular seal for sealing the annular clearance between an inner cylindrical member and an outer cylindrical member at pressures in the range of 2,000-7,500 psi and temperatures of 200°-400° F., comprising:
    a center portion made of rubber, said center portion being generally cylindrically shaped with a raised external rib and a corresponding raised internal rib circumscribing the mid region thereof, said ribs being adapted to seal against the internal diameter of said outer cylindrical member and against the external diameter of said inner cylindrical member, respectively, to form the primary sealing surfaces of said circular seal;
    a pair of external metal backup rings and a pair of internal metal backup rings, said external backup rings being received on either side of said raised external rib and said internal backup rings being similarly received on either side of said raised internal rib; and
    said raised external and raised internal ribs of said center portion being selectively sized to contact the respective internal diameter of said outer cylindrical member and the external diameter of said inner cylindrical member both before and after pressure acts on said seal and wherein said metal backup rings are undersized for said internal diameter of said outer cylindrical member and said inner cylindrical member respectively but are expandable when pressure acts on said seal to provide a zero clearance fit with said outer cylindrical member and said inner cylindrical member.

2. A circular seal for sealing the annular clearance between an inner cylindrical member and an outer cylindrical member at pressures in the range of 2,000-7,500 psi and temperatures of 200°-400° F., comprising:
    a center portion made of rubber, said center portion being generally cylindrically shaped with a raised external rib and a corresponding raised internal rib circumscribing the mid region thereof, said ribs being adapted to seal against the internal diameter of said outer cylindrical member and against the external diameter of said inner cylindrical member, respectively, to form the primary sealing surfaces of said circular seal;
    a pair of external metal backup rings and a pair of internal metal backup rings, said external backup rings being received on either side of said raised external rib and said internal backup rings being similarly received on either side of said raised internal rib; and
    said raised external and raised internal ribs of said center portion being selectively sized to contact the respective internal diameter of said outer cylindrical member and the external diameter of said inner cylindrical member both before and after pressure acts on said seal and wherein said metal backup rings are undersized for said internal diameter of said outer cylindrical member and said inner cylindrical member respectively so that said backup rings do not initially contact said internal diameter of said outer cylindrical member and said external diameter of said inner cylindrical member but are expandable when pressure acts on said seal to provide a zero clearance fit with said outer cylindrical member and said inner cylindrical member.

* * * * *